United States Patent [19]

Regueiro

[11] Patent Number: 5,511,520
[45] Date of Patent: Apr. 30, 1996

[54] CYLINDER HEAD CONSTRUCTION

[75] Inventor: Jose F. Regueiro, Rochester Hills, Mich.

[73] Assignee: Chrysler Corporation, Auburn, Mich.

[21] Appl. No.: 498,283

[22] Filed: Jul. 3, 1995

[51] Int. Cl.⁶ .................. F01L 1/44; F02F 1/24
[52] U.S. Cl. .................. 123/193.5; 123/184.24
[58] Field of Search ............... 123/193.5, 193.3, 123/90.27, 184.24, 184.34, 184.42, 184.47

[56] References Cited

U.S. PATENT DOCUMENTS

| | | | |
|---|---|---|---|
| 3,429,303 | 2/1969 | Roberts | 123/184.34 |
| 3,783,845 | 1/1974 | Brandstetter | 123/184.34 |
| 4,459,947 | 7/1984 | Honrath | 123/90.27 |
| 4,539,952 | 9/1985 | Nouno et al. | 123/90.27 |
| 4,622,941 | 11/1986 | Le Creurer et al. | 123/432 |
| 4,793,297 | 12/1988 | Fujii et al. | 123/193.5 |
| 5,042,440 | 8/1991 | Joseph . | |
| 5,080,057 | 1/1992 | Batzill et al. . | |
| 5,150,675 | 9/1992 | Murata | 123/193.5 |

OTHER PUBLICATIONS

*Automotive Engineering*, Jan. 1995, pp. 23–25, "The Mercedes–Benz Four–Valve Diesel".

*Primary Examiner*—Marguerite McMahon
*Attorney, Agent, or Firm*—Kenneth H. MacLean

[57] ABSTRACT

A cylinder head for an internal combustion engine that includes an upper head portion and a lower head portion provided with a valve train and in which the lower head portion is integrally formed with a pair of laterally spaced upwardly extending side walls. One of the side walls is integrally formed with an air intake manifold which communicates with an air intake passage located in the lower head portion via an air inlet port a portion of which is formed in the side wall incorporating the manifold so as to permit the intake passage to be nearly straight and devoid of any severe bends.

10 Claims, 3 Drawing Sheets

CYLINDER HEAD CONSTRUCTION

This invention concerns internal combustion engines and, more particularly, relates to a new and improved cylinder head incorporating intake valve means, exhaust valve means, and overhead cam means for actuating the valve means.

BACKGROUND OF THE INVENTION

In certain engines such as small diesels employing four valve direct-acting double-overhead-camshaft cylinder heads, the camshaft journals are located between adjacent cylinders rather than at the transversal centerline of the cylinder as is more common with gasoline engines. The reason for this difference is that in gasoline engines the diameter of the spark plug, the diameter of the spark plug installation tool and the surrounding spark plug well, combined with a relatively long distance between center lines of both camshafts, allow the journals to be placed at the transversal centerline of the cylinder. On the other hand, in a small diesel, one is forced to locate the camshaft journals between adjacent cylinders because the center space between the centralized injector and/or prechamber and injector in the transversal plane is small, the camshaft and camshaft journals are large in diameter, and the camshaft centers are relatively close. As a result, it is necessary to build the structure supporting the camshaft bearings and tappet guides separate from the lower cylinder head to allow the headbolts to be installed and tightened initially before the cam bearing and tappet guide structure is installed and fastened to the lower head. In other words, a two-piece cylinder head is required.

Presently, the only diesel engine in production with this approach is the Mercedes-Benz engine introduced in October of 1993. Some designs proposed by me in some of my other copending patent applications also generally conform to this new category of two-piece cylinder head engines. In each of these designs, the lower portion of the cylinder head incorporates intake and exhaust ports, valves, retainers and locks as well as a centrally located spark plug for gasoline engines or, alternatively, a fuel injector or a prechamber and fuel injector if the engine is a diesel. The cam and tappet carrier or upper head, which is bolted to the lower head and carries the camshafts, tappet guides and inverted-bucket tappets, is covered by a valve cover. The lower head includes passages through which coolant flows while the upper head is bathed in oil.

In the aforementioned Mercedes-Benz diesel engine and also in a Porsche version disclosed in U.S. Pat. No. 5,080,057, the valve cover extends downwardly on all four sides to meet the four walls of the lower head that extend upwardly a small distance over the top deck of the lower head. A gasket is located between the valve cover and the lower head at a point much lower than the transversal horizontal plane intersecting the cam centerlines. In addition, the exhaust ports exit conventionally horizontally on a plane perpendicular to the longitudinal axis of the cylinder to provide double wall and water jacket separation between the hot exhaust gases and the oil in the upper portion of the cylinder head. In both the Mercedes-Benz design and the Porsche design, while the intake ports extend outwardly and upwardly at a angle to the flat deck of the engine block to improve the air flow, the structure of the cylinder head, starting at the short side walls of the lower head portion to a point above the upper line of the intake ports, results in an extremely high cylinder head construction. This then places the desirability of an even steeper intake port in conflict with the requirements for a low over-all engine height to allow for a low vehicular hoodline and reduced weight. In addition, in both of these designs, the intake manifold is bolted to the cylinder head utilizing machined surfaces, drilled and tapped bolt holes, and a plurality of fasteners, creating a situation which increases cost, weight, complexity and engine width to improve manifold design. Furthermore, in the Mercedes-Benz design, the high pressure fuel line feeding the injector must enter through one of the sides of the cylinder head, either through the short sidewall or through the valve cover, requiring the use of rubber grommets to insulate and seal the fuel line. The problem with using rubber grommets in such locations is that they eventually shrink, harden and crack, thereby causing oil leaks.

Thus, it should be apparent from the above that what is needed is a simpler cylinder head design, lighter, shorter, smaller, cheaper, based on simplified machining, reduced number of fasteners, reduced possibility of oil leaks, with improved porting and simplified manifolding with lower weight and bulk, all in one package.

SUMMARY OF THE INVENTION

Accordingly, the present invention is directed to a new and improved two-piece cylinder head in which the lower head has high sidewalls extending upwardly around the sides of the upper head which carries the camshafts and tappet guides. The valve cover seals against the top of the side walls so that the gasket therebetween is only subjected to oil splash and never to oil pooling at a level above the gasket. The valve cover can be readily manufactured as a simple relatively flat unit and be made of plastic or stamped from sound-deadening sandwiched sheet metal. Another advantage of having a high side wall formed with the lower head is that it permits the intake manifold to be integrally formed therewith and allows for long, nearly straight, intake passages at a high angle from the horizontal. These passages, although not as long as a ram-tuned intake manifold with long branches, is nevertheless comparable to existing manifolds with short branches, and are longer than the passages of conventional heads with built-in manifolds. Also, the lack of any substantial bends in the passages and their nearly straight run into the cylinder provides improved high velocity air flow with minimum pressure losses thereby tending to improve the fuel consumption and power while minimizing gaseous emissions. In addition, by having the air flow into the cylinder at a high velocity, it is possible to affect an earlier closing of the intake valves thereby helping to improve the trapped volumetric efficiency, minimizing air spit-back into the intake tract, and increasing the effective compression ratio so as to improve startability and provide quieter idle with relatively retarded injection timing as well as providing increased torque and lower smoke at low speeds and during periods of engine acceleration. Moreover, forming the intake manifold integrally with the side of the high sidewall, strengthens the cylinder head structure at this point and tends to minimize vibrations of the side wall. Thus, this arrangement of the intake manifold when used with a diesel engine tends to dampen the injector and combustion noise by increasing the number of walls and cavities between the injectors and the outside of the engine. Although it is not new to cast an intake manifold integrally with a cylinder head, in all cases that I am aware of, the manifold is cast at the level of the lower head. In addition, the ports always extend horizontally and never cut through the valve train or overhead space; space which, on the new category of two-piece head designs corresponds to what is referred to as the upper head.

A further advantage of having a high side wall design as described above is that the fuel line leading from the pump to the injectors inside the cylinder head can be fixedly secured to the side wall by a solid fitting which provides a positive seal for preventing oil from leaking out of the valve train cavity located in the upper head.

More specifically, the cylinder head according to the present invention is combined with an internal combustion engine having an engine block provided with a plurality of in-line cylinders and having a machined flat surface formed on the top portion thereof. The cylinder head takes the form of a two-piece unit consisting of a lower head portion and upper head portion. The lower head portion is secured to the aforementioned flat upper surface of the engine block and incorporates intake and exhaust ports with their corresponding intake and exhaust valves slidably disposed therein. The valves are biased toward their closed operative position by valve springs secured to the valves by conventional retainers and locks. A portion of the valve stem of each valve, along with the associated spring, retainer and lock protrudes into the valve train cavity, also called the overhead, or in this particular case of the subject application, the space occupied by the upper head; but does not form part of it. The upper head denomination herein applied best describes the part of the mechanism which operates the valves, including the camshafts and their supporting structure, the camshaft bearings, the tappets and the tappet guides. When the present invention is used in a diesel engine, the fuel injector is centrally located between the intake and the exhaust valves, and a pump, secured to the lower head, is provided for supplying fuel to the fuel injectors. If used in an Otto cycle engine, a spark plug replaces the diesel system in the center of the cylinder head. In addition, a pair of laterally spaced parallel side walls are integrally formed with the lower head portion of the cylinder head. The side walls extend upwardly from the lower head portion and terminate at a point above a plane extending through the rotational axes of the overhead camshafts.

In the diesel engine version of the present invention, one of the side walls is formed with an opening which is sealingly closed by a bulkhead union one end of which connects to the fuel injector and the other end of which is connected to the pump. In both the diesel and Otto cycle versions of the invention, the lower head portion of the cylinder head is formed with intake passages which extend upwardly from the intake valves at a relatively high angle relative to the flat top surface of the engine block. An intake manifold communicates with the intake passages and is integrally formed with the lower head portion so as to define an intake plenum located outboard of the cylinder head with a portion of an associated side wall serving as a common wall between the intake plenum and the valve train.

BRIEF DESCRIPTION OF THE DRAWINGS

Other features and advantages of the present invention will be more apparent from the following detailed description when taken with the drawings in which.

DESCRIPTION OF THE PREFERRED EMBODIMENT

Figure 1:
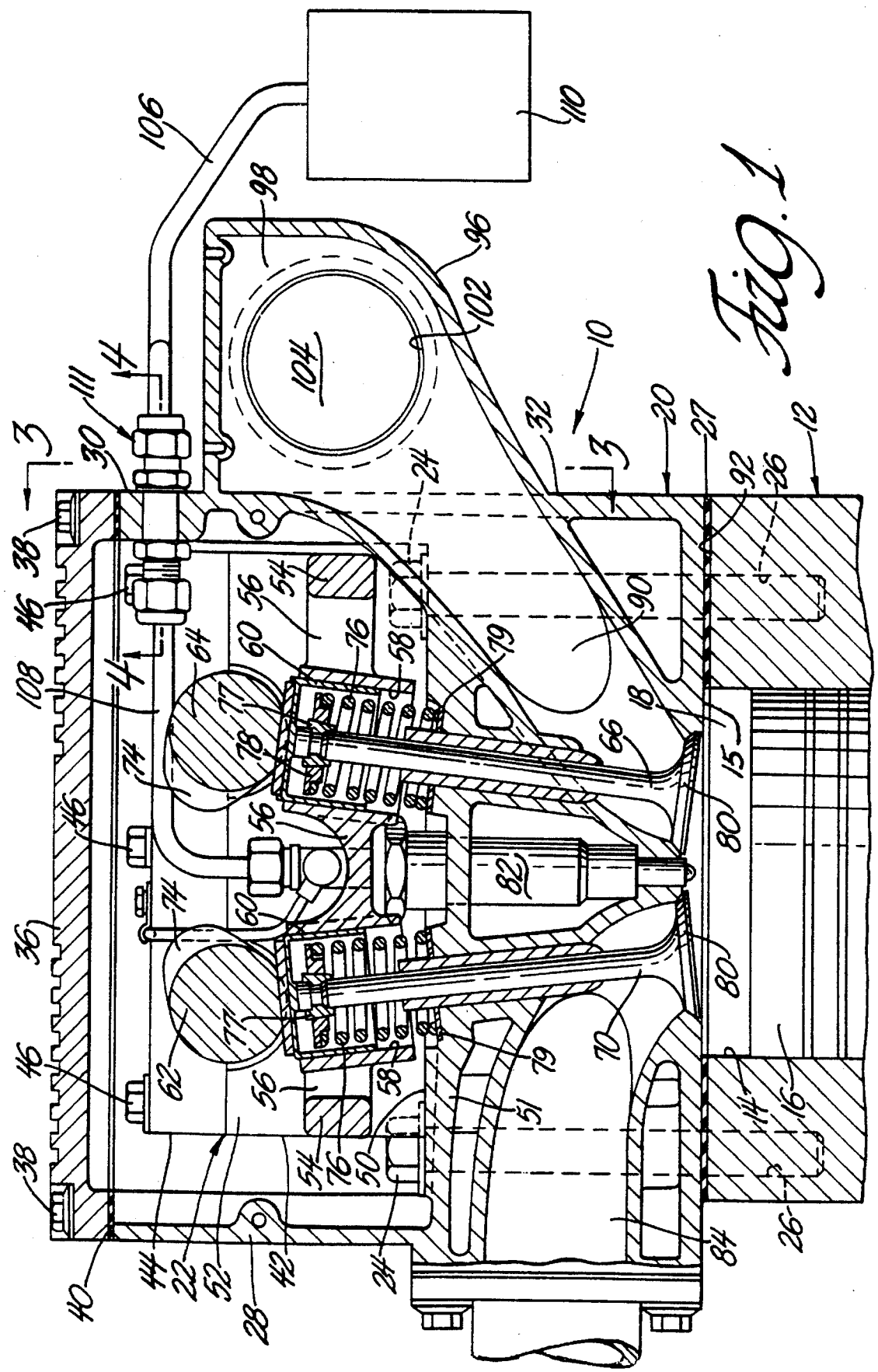
FIG. 1 is a cross-sectional view of an internal combustion engine having a cylinder head made in accordance with the present invention.
Figure 2:
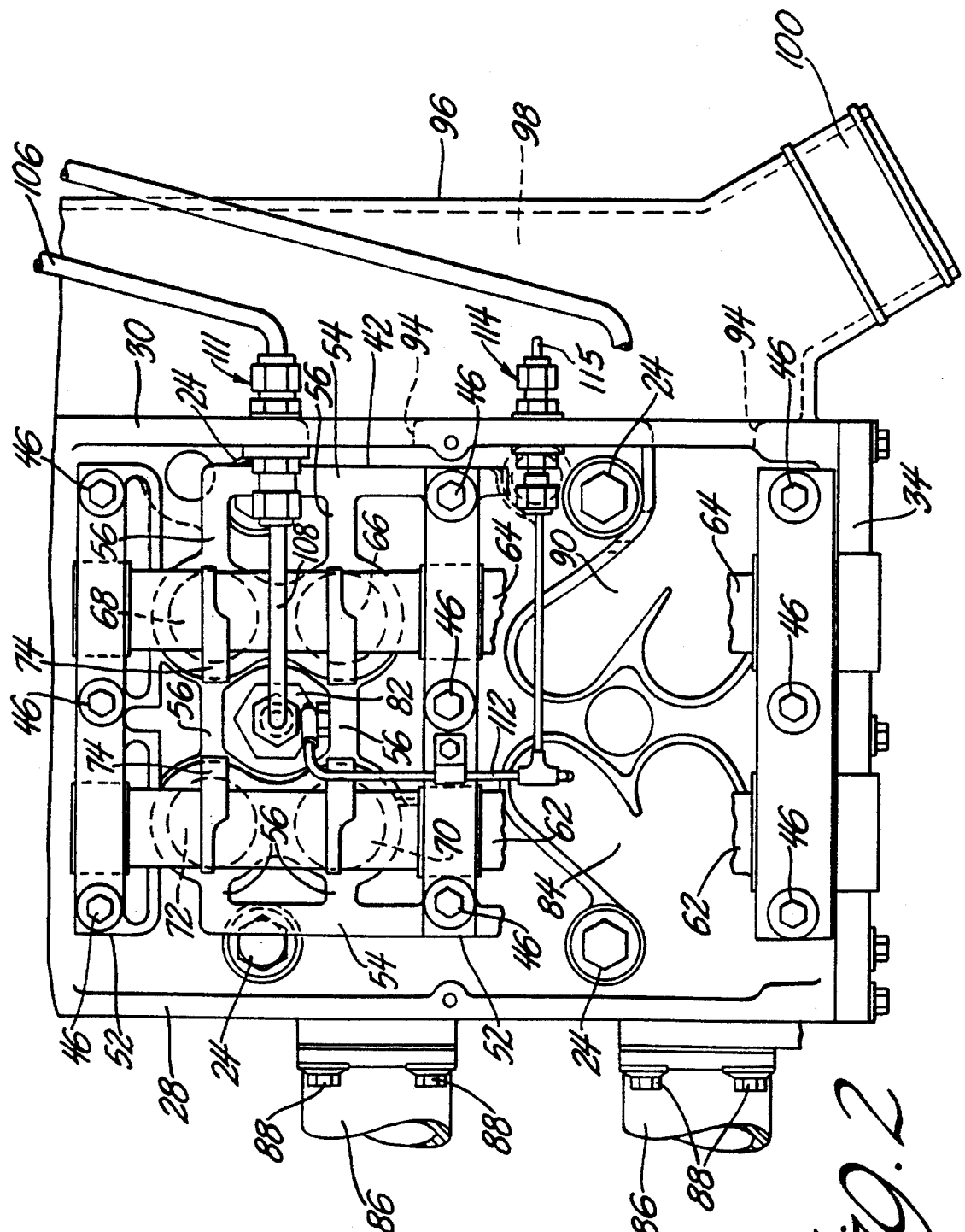
FIG. 2 is a plan view of the front end of the internal combustion engine seen in FIG. 1 with various parts removed so as to more clearly show the construction of the cylinder head.

Referring to the drawings and more particularly to FIGS. 1 and 2 thereof, a multi-cylinder internal combustion engine of the open-chamber diesel type is shown in cross-section and is generally identified by the reference numeral 10. The internal combustion engine 10 includes a conventional engine block 12 having one or more aligned cylinder bores formed therein (only one of which is shown and is identified by reference numeral 14) and has a new and improved cylinder head according to the present invention mounted thereon. As seen in FIG. 1, cylinder bore 14 and each of the other cylinder bores has a piston 16 supported in a conventional manner for reciprocation relative thereto and together with the top end of the piston 16 forms a combustion chamber 18 at the upper end of the cylinder bore 14 with a portion of the lower surface 15 of the cylinder head 10 forming the upper end of the combustion chamber 18.

It will be noted that inasmuch the engine block, pistons and the various operating components normally associated therewith are well known to those skilled in the art of engine design, a detailed showing and description of such parts and components is not being provided herein. Instead, the heart of the invention, namely the cylinder head construction which includes a lower head portion 20 and an upper head portion 22 and components and parts associated therewith will now be described in detail. In addition, it will be noted that as seen in FIG. 2, only the front end of the internal combustion engine 10 is shown with certain parts and components having been removed so as to show in more detail various internal parts of the cylinder head construction. It will also be noted that in describing the cylinder head construction, only the parts associated with one cylinder of the engine block will be described in detail and it will be understood that similar and identical parts are associated with each of the other cylinders of the engine block 12.

More specifically, the lower head portion 20 of the cylinder head is secured to the upper end of the engine block 12 by a plurality of head bolts 24 which extend through the body of the lower head portion 20 into threaded holes 26 formed in the engine block 12. A gasket 27 provides a seal between the lower head portion and the block 12. A pair of laterally spaced and parallel side walls 28 and 30 are integrally formed with the base 32 of the lower head portion 20 and extend upwardly and cooperate with end plates (one of which is only shown in FIG. 2 and identified by reference numeral 34) to enclose the upper head portion 22. In addition, a relatively flat valve cover 36 is connected to the side walls by a plurality of relatively small cap screws 38. As is conventional, a gasket 40 is located between the valve cover 36 and the top of the sidewalls 28 and 30 25 and the end plates 34.

The upper head portion 22 is formed in two parts consisting of a camshaft and tappet-guide carrier portion 42 and a camshaft cap 44 both of which are secured to the lower head portion by a plurality of cap screws 46 which extend into threaded holes formed in the upper end of the base 32 of the lower head portion 20.

The camshaft and tappet-guide carrier portion 42 is formed with an upstanding camshaft base 52 which, as seen in FIG. 2, is located between each of the cylinder bores 14 of the engine 10. Each pair of adjacent camshaft bases 52 are integrally formed with longitudinally orientated bridging portions 54 and transverse bridging portion 56 that together serve as a tappet carrier interconnecting the adjacent camshaft bases 52. In this regard, it will be noted that the bridging portions 54 and 56 serve to define cylindrical tappet guides 58 which support and guide inverted bucket tappets 60 which form a part of a valve train located within the cylinder head construction. A camshaft and tappet guide carrier portion similar to the type disclosed in FIGS. 1 and 2 can be seen in my copending U.S. patent application Ser. No. 334,304, filed on Nov. 4, 1994 and entitled "Cylinder Head Construction for Internal Combustion Engines".

The valve train provided in the cylinder head at each combustion chamber 18 of the engine 10 includes a pair of laterally spaced camshafts 62 and 64, a pair of air intake valves 66 and 68, and a pair of exhaust valves 70 and 72. The camshafts 62 and 64 are supported by the camshaft bases 52 and the camshaft caps 44 for rotation about a pair of parallel axes located in a preferably common and substantially horizontal plane. Each of the camshafts 62 and 64 is formed with cam lobes 74 which serve to engage the associated tappet to move the latter downwardly for opening the associated valve against the bias of a coil compression spring 76, one end of which abuts a retainer 78 secured to the upper end of the stem of the valve by a conventional two-piece lock 77 and the other end of which is seated on spring-base washer 79 disposed in a conventionally spot-faced recess on the top deck 51 of the lower head portion 20. As seen in FIG. 1, each of the valves 66–72 is provided with a valve head 80 which is normally maintained in a closed position by the associated compression spring 76. A fuel injector 82 is secured to the lower head portion 20 and as seen in FIG. 2 is positioned centrally relative to the exhaust valves 70, 72 and the intake valves 66, 68.

Each of the valve heads 80 of the exhaust valves 70, 72 cooperate with a valve seat formed or inserted in the lower head portion 20 to open and close an exhaust passage 84 which is also formed in the lower head portion 20 of the cylinder head. As seen in FIG. 1, the exhaust passage 84 extends out of the lower cylinder head 20 along an axis which is approximately 90 degrees to a vertical plane passing through the longitudinal center axis of each of the cylinders. The exhaust passage 84 in the lower head portion 20 is connected with an exhaust manifold (not shown) having flanged pipe sections 86 which are secured to the lower head portion 20 by a plurality of cap screws 88.

Figure 3:
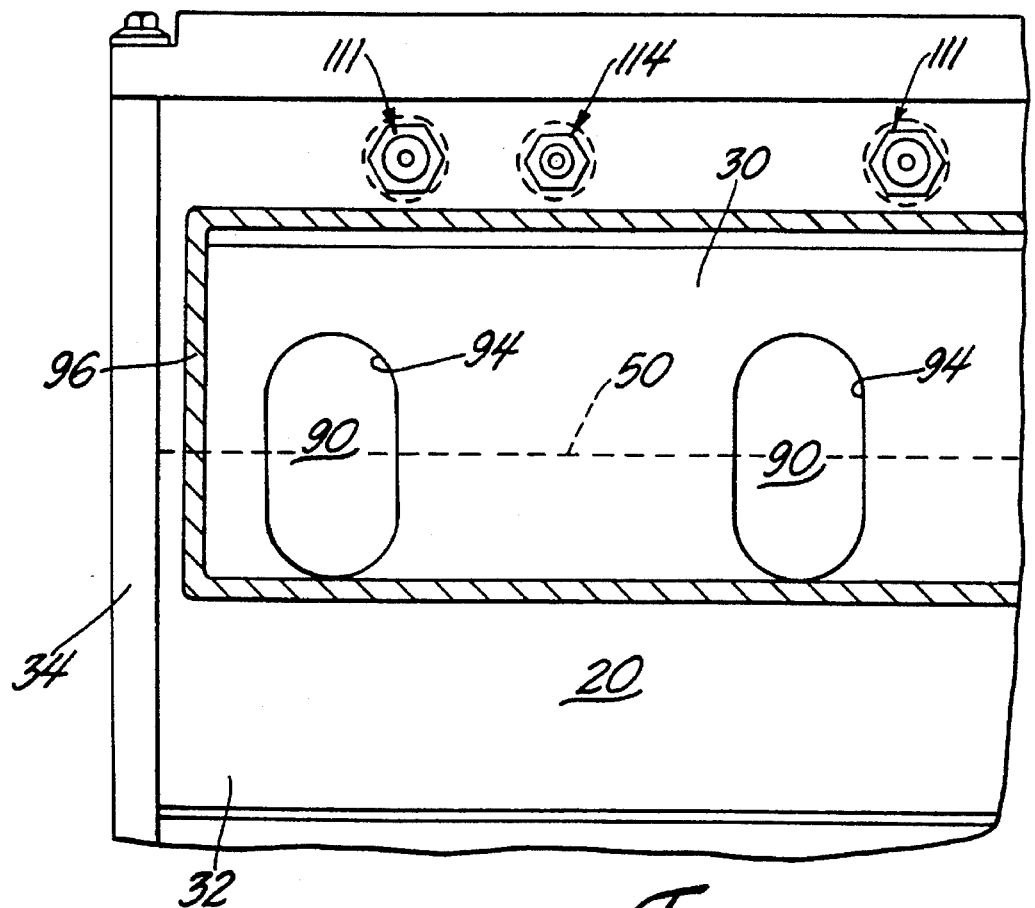
FIG. 3 is a sectional view taken on line 3—3 of FIG. 1.

Similarly, each of the valve heads 80 of the intake valves 66, 68 cooperate with a valve seat to open and close an intake passage 90 formed in the lower head portion 20. In this case, however, the intake passage 90 extends upwardly at a high angle relative to the machined top surface 92 of the engine block 12 to which the cylinder head is secured. For that matter, the intake passage 90 is formed along an axis which has an included angle of approximately 45 degrees with the aforementioned top surface 92 of the engine block 12. As seen in FIG. 3, this permits a portion of the intake passage 90 to exit the lower head 20 portion via a port window 94 in side wall 30 at a level above the joint line 50 between the lower head portion 20 and the upper head portion 22 and communicate with an intake manifold 96 which is integrally formed with the side wall 30. Thus, as seen in FIGS. 1, 2 and 3, the intake manifold 96 defines an intake plenum 98 which is located outboard of the cylinder head with portions of the side wall 30 of the lower head portion 20 serving as a common wall which separates the intake plenum 98 from the upper head portion 22 which houses the valve train. As seen in FIG. 2, the front end of the intake manifold 96 is integrally formed with a cylindrical inlet pipe 100 for air inlet purposes. The rear end of the intake manifold 96 is formed with a circular core opening 102 that is sealed by a core plug 104 fixed within the opening.

The fuel injector 82 is part of a conventional pumpline-nozzle injection system and is adapted to receive fuel via pipe lines 106 and 108, the former of which is connected to a pump 110 capable of supplying the fuel at a high pressure. A bulkhead union 111 interconnects the lines 106 and 108 at the side wall 30. A low pressure return pipe 112 line is connected to the fuel injector 82 and to the other injectors in the engine. As is the case with the supply high pressure supply lines 106 and 108, the fuel line 112 is connected to a bulkhead union 114 which is secured to the side wall 30 and, except for size, is the same structurally as the bulkhead union 111. The line 115 which is connected to the outside end of the bulkhead union 111 directs the fuel return to the pump or back to the fuel tank (not shown).

Figure 4:
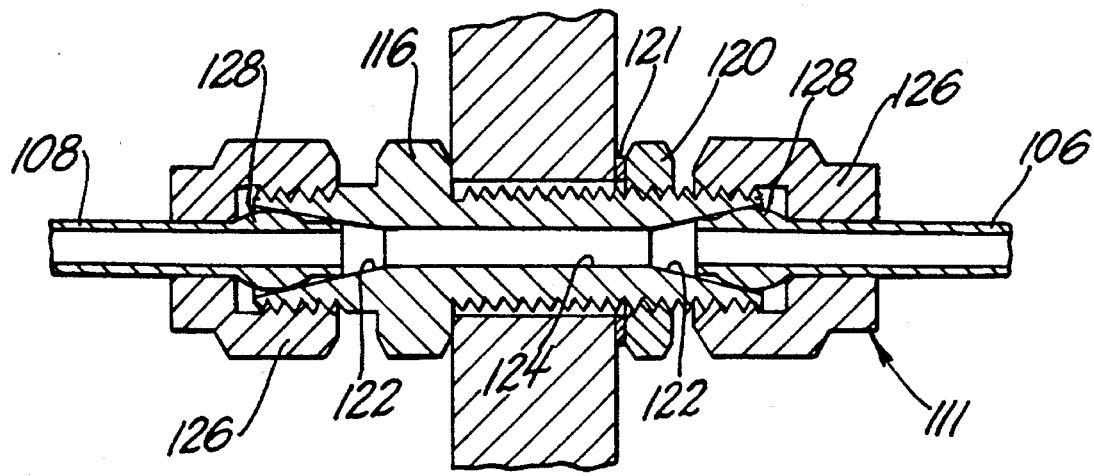
FIG. 4 is a sectional view of a bulkhead union used with the cylinder head according to the present invention and taken on line 4—4 of FIG. 1.

Each of the bulkhead unions 111 and 114 is sealingly secured to the side wall 30 in the manner shown in FIG. 4 and includes a shouldered body portion 116 which is received by a circular opening 118 formed in the sidewall 30. The body portion 116 threadably receives a nut 120 which clamps the body portion to the sidewall 30 through a washer type gasket 121. Each end of the body portion 116 is formed with a conical opening 122 which connects with a through-passage 124 formed in the body portion 116. The opposed ends of the body portion 116 have external threads formed thereon. A retainer nut 126, rotatably supported by the associated line, is threaded onto the threaded end of the body portion 116 and compresses a ball end 128 fixed with the associated line into the conical opening 122 and thereby provides a sealed connection between the two parts.

Although not shown, it will be understood that the upper head portion 22 of the cylinder head is provided with the usual lubricant system connected to the lubricating oil circulation system of the engine 10. As conventional, the lubricant system in the upper head portion 22 includes ducts which supply lubricating oil to the camshaft bearings, tappets, and oil mist to the valve stems of the intake valves 66, 68 and the exhaust valves 70, 72, as well as oil drains to return the oil back to the oil sump. In addition, it will be understood that the lower head portion 20 of the cylinder head is formed as a water jacket with passages through which coolant flows for removing heat from the engine 10. Also, the single-plane valve cover gasket 40 is placed above the plane defined by the camshaft centerlines.

It will be apparent to those skilled in the art that the cylinder head construction made in accordance with the present invention and described provides a simpler design which, among other benefits, reduces oil leaks, and improves the manifold arrangement as alluded to hereinbefore. In other words, by having the cylinder head construction provided with integral high sidewalls 28 and 30, the gasket 40 between the valve cover 36 and the cylinder head is located above the level where the oil may accumulate. Moreover, the integral high sidewalls 28 and 30 permit the use of rigid bulkhead unions 111, 114 which provide a positive seal and do not shrink or harden and create oil leaks as can occur with rubber grommets. Another advantage in having integral high side walls 28 and 30 is that it permits the intake manifold to be formed integrally with a side wall and have the intake passages provide a nearly straight path for the air flow within the cylinder head. Thus, as previously mentioned, by eliminating substantial bends in the intake passages, one can realize improved air flow with minimum pressure losses so as to improve fuel consumption and power while minimizing emissions. Still another advantage in having an intake manifold integrally formed with the side wall is that it tends to dampen noise caused by the injector and the combustion in the cylinders.

Various changes and modifications can be made in the construction of this cylinder head assembly without departing from the spirit of the invention. Such changes and modifications are contemplated by the inventor and he does not wish to be limited except by the scope of the appended claims:

The embodiments of the invention in which an exclusive property or privilege is claimed are defined as follows:

1. A cylinder head for an internal combustion engine having an engine block provided with a plurality of cylinders and having a flat surface formed on the top portion thereof, said cylinder head including a lower head portion and an upper head portion secured to said flat surface of said engine block, a valve train incorporated in said cylinder head and associated with each of said cylinders and including a pair of intake valves, a pair of exhaust valves, and a pair of rotatable camshafts for actuating said intake valves and said exhaust valves, a pair of laterally spaced side walls integrally formed with said lower head portion of said cylinder head and extending upwardly therefrom, said lower head portion having an intake passage extending upwardly from said intake valves at a high angle relative to said flat surface of said engine block, and an intake manifold communicating with said intake passage and being integrally formed with said lower head portion so as to define an intake plenum located outboard of said cylinder head with a large portion of one of said side walls serving as a common wall between said intake plenum and said upper head portion.

2. The cylinder head as set forth in claim 1, wherein said side walls terminate at a level above the rotational axes of said camshafts.

3. The cylinder head as set forth in claim 1, wherein said intake passage communicates with said intake plenum via a port having a portion thereof formed in said one of said side walls.

4. The cylinder head as set forth in claim 3, wherein said portion of said port is located above the joint line between said lower head portion and said upper head portion.

5. A cylinder head for an internal combustion engine having an engine block provided with a plurality of cylinders and having a machined flat surface formed on the top portion thereof, said cylinder head having a lower head portion and an upper head portion secured to said flat surface of said engine block, a valve train incorporated in said cylinder head and associated with each of said cylinders and including a pair of intake valves, a pair of exhaust valves, and a pair of overhead camshafts for actuating said intake valves and said exhaust valves, a fuel injector located centrally between said intake valves and said exhaust valves and a pump for providing fuel to said fuel injector, a pair of laterally spaced parallel side walls integrally formed with said lower head portion of said cylinder head and extending upwardly therefrom, one of said side walls having an opening formed therein and having a bulkhead union located in said opening and secured to said one of said side walls with one end of said bulkhead union connected to said fuel injector and the other end of said bulkhead union being connected to said pump, said cylinder head having an intake passage extending upwardly from said intake valves at a relatively high angle relative to said flat surface of said engine block, and an intake manifold communicating with said intake passage and being integrally formed with said lower head portion so as to define an intake plenum located outboard of said cylinder head with a portion of said one of said side walls serving as a common wall between said intake plenum and said valve train.

6. A cylinder head for an internal combustion engine having an engine block provided with a plurality of cylinders and having a machined flat surface formed on the top portion thereof, said cylinder head having a lower head portion and an upper head portion secured to said flat surface of said engine block, a valve train mechanism incorporated in said cylinder head and associated with each of said cylinders and including a plurality of intake valves, a plurality of exhaust valves, and double overhead camshafts for actuating said intake valves and said exhaust valves, a fuel injector located centrally between said intake valves and said exhaust valves and a pump for providing fuel to said fuel injector, a pair of laterally spaced parallel side walls integrally formed with said lower head portion of said cylinder head and extending upwardly therefrom and terminating at a point above a plane extending through the rotational axes of said double overhead camshafts, one of said side walls having an opening formed therein and having a bulkhead union located in said opening and secured to said one of said side walls with one end of said bulkhead union connected to said fuel injector and the other end of said bulkhead union being connected to said pump, said cylinder head having an intake passage extending upwardly from said intake valves at a relatively high angle relative to said flat surface of said engine block, and an intake manifold communicating with said intake passage and being integrally formed with said lower head portion so as to define an intake plenum located outboard of said cylinder head with a portion of said one of said side walls serving as a common wall between said intake plenum and said valve train.

7. The cylinder head as set forth in claim 6, wherein said intake passage communicates with said intake plenum via a port having a portion thereof formed in said one of said side walls.

8. The cylinder head as set forth in claim 7, wherein said portion of said port is located above the joint line between said lower head portion and said upper head portion.

9. The cylinder head as set forth in claim 8, wherein said intake passage extends upwardly along an axis which forms an included angle of approximately 45 degrees with said flat surface of said engine block.

10. The cylinder head as set forth in claim 9, wherein approximately fifty percent of said one of said side wall serves as said common wall between said intake plenum and said valve train.

* * * * *